(12) United States Patent
Verrill et al.

(10) Patent No.: US 6,440,379 B1
(45) Date of Patent: Aug. 27, 2002

(54) APPARATUS TO RECOVER SULFUR FROM CONCENTRATED ACID GAS INTO ALKALINE SOLUTION

(75) Inventors: Christopher L. Verrill, Charleston County, SC (US); William Downs, Washington Township, Stark County, OH (US)

(73) Assignee: McDermott Technology, Inc., New Orleans, LA (US)

( * ) Notice: Subject to any disclaimer, the term of this patent is extended or adjusted under 35 U.S.C. 154(b) by 0 days.

(21) Appl. No.: 09/435,745

(22) Filed: Nov. 8, 1999

(51) Int. Cl.$^7$ .................. B01D 53/52; B01D 53/34; B01J 10/00

(52) U.S. Cl. .............. 423/243.01; 423/210; 423/242.1; 422/160; 422/161; 422/168; 422/171; 422/172; 422/173; 422/191; 422/193; 422/194

(58) Field of Search ................. 422/160, 161, 422/168, 172, 173, 191, 193, 194; 423/210, 243.08, 242.1, 243.01

(56) References Cited

U.S. PATENT DOCUMENTS

| | | | | |
|---|---|---|---|---|
| 2,868,524 A | * | 1/1959 | Annable et al. | 422/193 |
| 3,905,774 A | * | 9/1975 | Kotting | 422/172 |
| 4,198,388 A | * | 4/1980 | Laslo et al. | 423/210 |

* cited by examiner

*Primary Examiner*—Hien Tran
(74) *Attorney, Agent, or Firm*—E. Marich; R. C. Baraona

(57) ABSTRACT

An apparatus and method for sulfur recovery uses a scrubber tower with a plurality of vertically spaced scrubber trays in the tower. Sulfide-lean liquor is supplied to each of the trays and an acid gas is supplied to the tower below the trays. A downcomer extends in the tower and through the trays for accumulating liquid from the trays and moving the liquid to the bottom of the tower. The sulfide-lean liquor and acid gas are selected to form a sulfite-rich or sulfide-rich liquor in each of the trays which are brought to the bottom of the tower through the downcomer for removal from the tower.

18 Claims, 3 Drawing Sheets

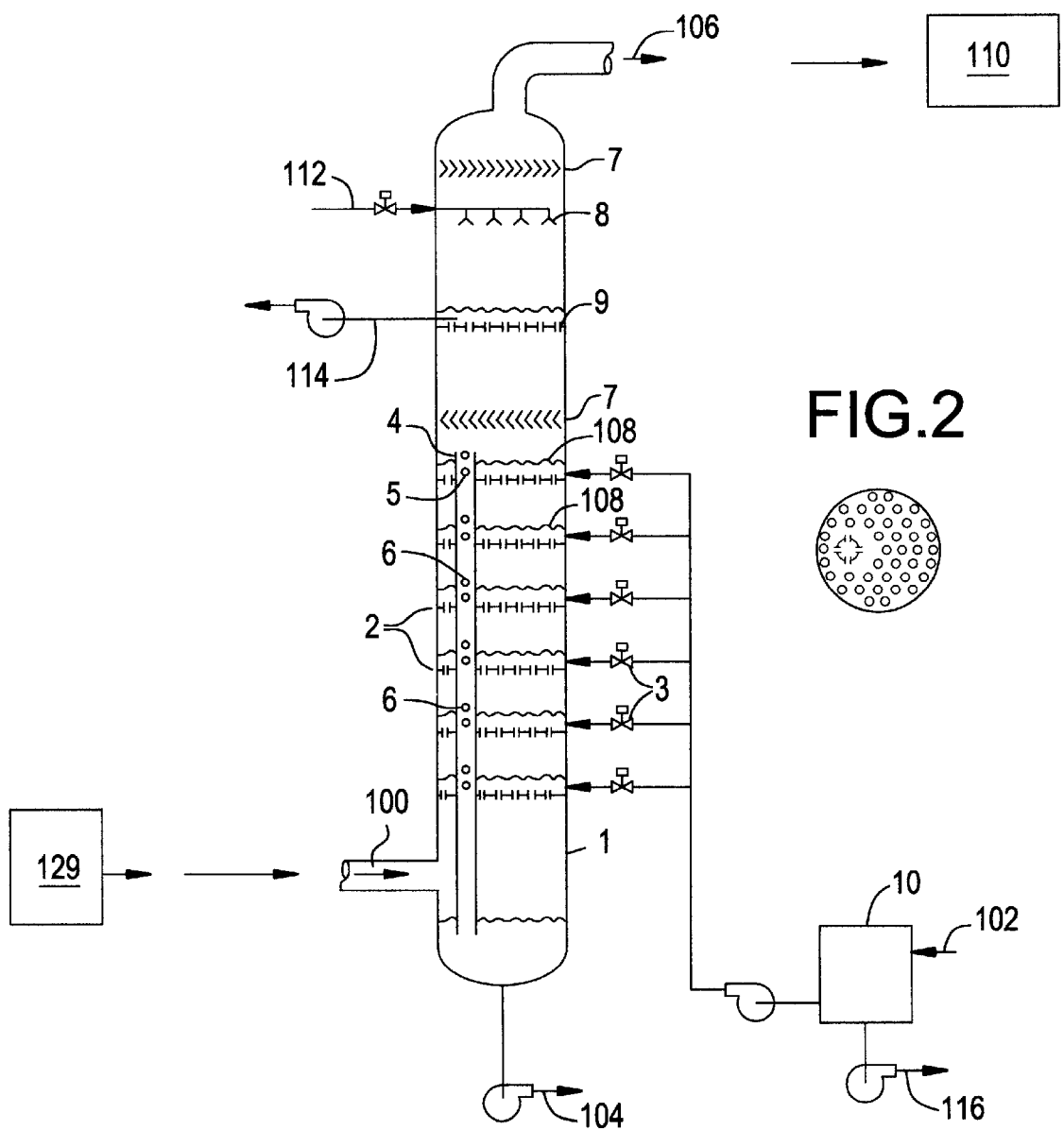

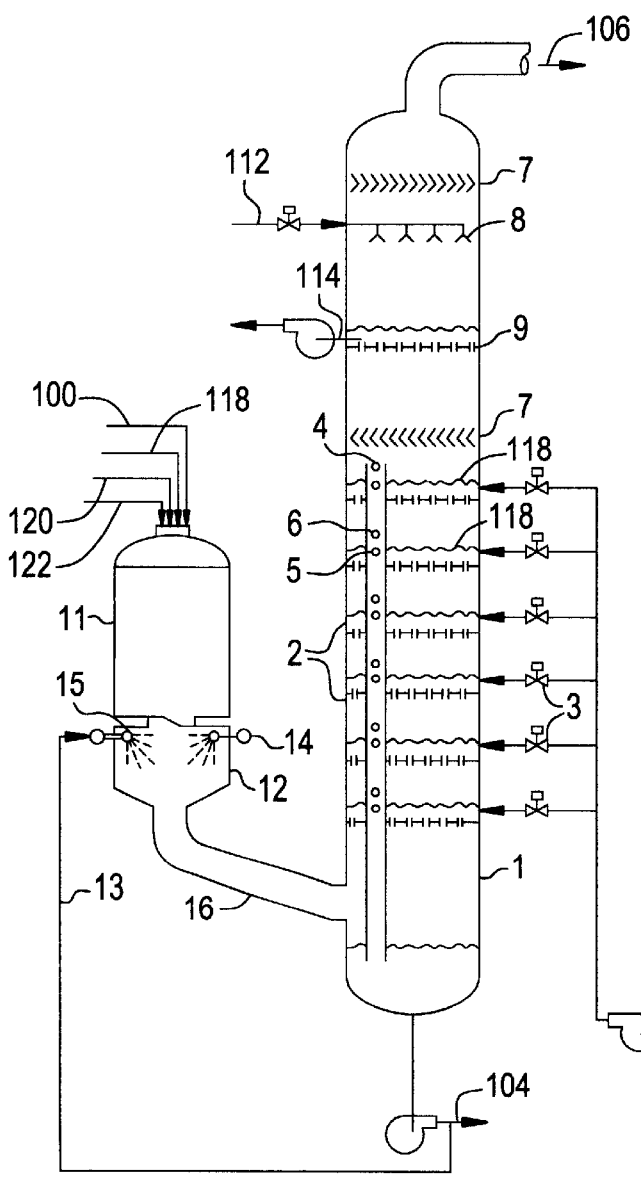
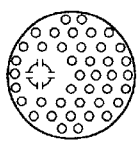
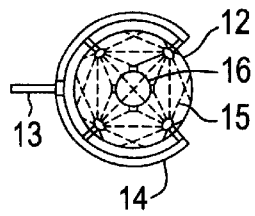
FIG.3
FIG.4
FIG.5

APPARATUS TO RECOVER SULFUR FROM CONCENTRATED ACID GAS INTO ALKALINE SOLUTION

FIELD AND BACKGROUND OF THE INVENTION

The present invention relates, in general, to kraft pulping chemical recovery processes, and, in particular, to a new and useful apparatus for recovering sulfur from concentrated acid gases.

In the kraft pulping process, wood chips are reacted with a strong solution of alkali and sulfur which is known as white liquor, to liberate papermaking fibers. The spent liquor from the pulping operation (black liquor) consists of the dissolved wood components and partially deactivated chemicals. In the conventional kraft chemical recovery process, the sodium and sulfur are recovered as sodium carbonate ($Na_2CO_3$) and sodium sulfide ($Na_2S$) in the molten smelt generated by the combustion of black liquor in Tomlinson recovery boilers. The smelt is tapped from the boiler hearth and dissolved with a weakly alkaline process water (weak wash) to form green liquor. Sodium carbonate in green liquor is causticized by reaction with lime, CaO, to form sodium hydroxide (NaOH). The byproduct $CaCO_3$ solids are separated and thermally decomposed in a lime kiln or similar device to recover CaO. The clarified solution of NaOH and $Na_2S$ is the white liquor which is returned to the pulping operation.

Gasification is an alternative to the Tomlinson boiler operation whereby black liquor is partially combusted with a sub-stoichiometric amount of oxygen to convert the organic portion of the liquor into a fuel gas which can be burned, for example, in a gas turbine. Such an arrangement is expected to increase the overall energy efficiency of the kraft pulping operation. One of the challenges to gasification is recovery of the sodium and sulfur from the black liquor in ways that do not adversely affect the balance of pulp mill operations.

In all black liquor gasification processes, some of the sulfur content of the black liquor ends up as hydrogen sulfide ($H_2S$) in the fuel gas. Most of the sodium and the remaining sulfur leave the gasifier as molten smelt (or solid ash in the case of solid-phase gasification). The smelt contains mostly $Na_2CO_3$ and some $Na_2S$; these chemicals are easily recovered by dissolution in weak wash or other process water streams. Various schemes have been proposed to recover $H_2S$ directly from the fuel gas by absorption in alkaline process streams. See, for example, U.S. Pat. No. 4,808,264 to Kignell; U.S. Pat. No. 5,284,550 to Tanca, et al.; U.S. Pat. No. 5,556,605 to Stigsson; and U.S. Pat. No. 5,634,950 to McIlroy, et al.

There is an inherent difficulty in these approaches because the fuel gas contains a much greater amount of $CO_2$ relative to $H_2S$, and the carbon dioxide is subject to absorption by sodium hydroxide during $H_2S$ scrubbing operations. Co-absorption of $CO_2$ thus increases lime demand in the causticizing operation which would, as a minimum, require additional fuel input to the lime kiln for calcining the $CaCO_3$ byproduct and could potentially require additional kiln capacity if lime processing is limited.

The present invention is a critical component for minimizing adverse impacts on causticizing operations with black liquor gasification processes.

SUMMARY OF THE INVENTION

An object of the present invention is to provide a gas-liquid contacting device in which an acidic sulfur gas ($H_2S$ or $SO_2$) is absorbed selectively from a gas stream containing the sulfur gas and $CO_2$ into an aqueous alkaline solution. The invention minimizes the co-absorption of $CO_2$ into the alkaline solution. The apparatus of the invention is intended to function as a component of pulp and paper mill chemical recovery processes based on spent liquor gasification. The spent liquor consists of the dissolved wood components and partially deactivated chemicals.

The gasification process operates at elevated pressure and utilizes a physical solvent scrubber/stripper system to separate a stream of concentrated acid gas (consisting substantially of $H_2S$ and $CO_2$) from the fuel gas components ($H_2$, CO, $CH_4$) generated by the partial combustion of spent liquor with a sub-stoichiometric amount of oxidant. The concentrated acid gas is passed to the present invention where it contacts the sorbent; an aqueous solution of sodium hydroxide with lesser amounts of dissolved sodium sulfide, sulfate, carbonate, bicarbonate and chloride. This alkaline liquor is provided from a causticizing operation in which a stream of dissolved sodium carbonate is reacted with quicklime (CaO) in the conventional manner.

The various features of novelty which characterize the invention are pointed out with particularity in the claims annexed to and forming a part of this disclosure. This application is related to, but distinct and separate from, the processes disclosed in U.S. application Ser. Nos. 09/298,533 and 09/298,974, in which both Mr. Downs and Mr. Verrill are also listed as co-inventors for each application. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a side sectional view of a scrubber tower of the present invention;

FIG. 2 is a radial sectional view of the tower of FIG. 1;

FIG. 3 is a side sectional view of another embodiment of the invention;

FIG. 4 is a radial sectional view of a tower in the embodiment of FIG. 3;

FIG. 5 is a radial sectional view of a combustion device in the embodiment of FIG. 3.

DESCRIPTION OF THE PREFERRED EMBODIMENT

Figure 6:
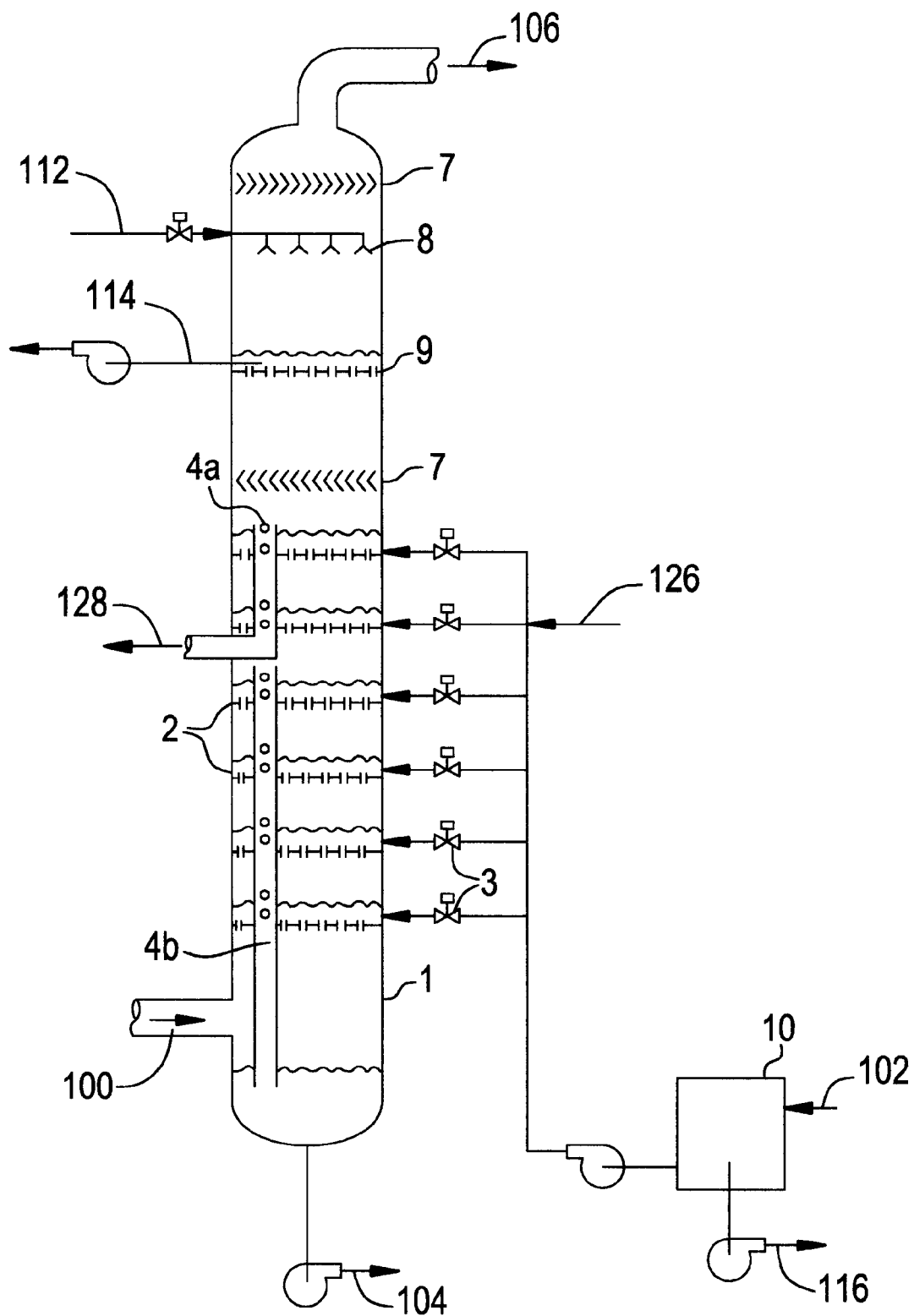
FIG. 6 is a side sectional view of a scrubber tower of a still further embodiment of the present invention.

FIG. 1 illustrates the features of the invention as they pertains to the regeneration of the conventional pulping chemicals NaOH and $Na_2S$ (a.k.a. white liquor) for the kraft process.

An acid gas stream 100 is delivered at slightly elevated pressure and temperature (e.g. 30 psia and 120° F.) from a physical solvent gas clean up system 129 in a main gasification process (not shown). The acid gas enters a scrubber tower 1 where $H_2S$ is removed by reaction with a sulfide-lean white liquor 102 to form a sulfide-rich white liquor 104. Treated tail gas 106 is discharged to the kraft pulp mill non-condensable gas (NCG) collection and disposal system 110 where it is ultimately burned in a power boiler or lime kiln. Alternately, this tail gas can be compressed and recombined with the fuel gas.

The scrubber tower 1 contains one or more perforated trays 2. A shallow pool of absorbent is maintained on each tray and contacted with gas by bubble cap or similar devices mounted in the trays. A number of stages with minimal gas-liquid contact time favors $H_2S$ over $CO_2$ absorption.

FIG. 1 shows one possible flow arrangement in which fresh absorbent is introduced to six bubble trays where the level on each tray is maintained by individual flow control valves 3. Absorbent overflows into a common downcomer 4 and is collected at the bottom of the tower. Multiple perforations 5 around the radius of the downcomer pipe 4 provide means for the liquid to enter the downcomer. A second set of radial perforations 6 in the downcomer provide a means to control overflow during upset conditions. These perforations are located above the normal ebullient liquid level 108 on each tray. FIG. 2 illustrates the relative positions of perforations in the trays 2 and the downcomer 4.

The total flow in the downcomer increases from the top to the bottom of the tower with the additional runoff from each stage; therefore, the pipe must be sized to prevent back flow through the perforations onto the lower trays. Alternately, one or more additional downcomer pipes could be included to accommodate the higher cumulative flow at the lower tray elevations in the tower.

Mechanical flow-turning devices 7 minimize entrainment of alkaline liquor in the up-flowing gas. As a final polishing step to prevent alkaline liquor carryover into the mill's NCG system 110, a dilute process stream such as condensate or weak wash 112 from a high pressure system is bled from the pressurized gasification system and delivered to spray nozzles 8 at the discharge of the scrubber. This stream is collected separately on a single perforated tray 9 and returned to the gasification process at an appropriate point 114. Tail gas 106 exits scrubber 1 and is subsequently conveyed to NCG system 110.

The molar ratio of $Na_2S$ to the active chemicals in white liquor (NaOH and $Na_2S$) is commonly known as sulfidity. One possible absorbent in this process is low-sulfidity white liquor 102, taken as a slipstream from a white liquor surge tank 10 or an appropriate supply point. The high-sulfidity white liquor 104 from the scrubber 1 can be blended with the balance of the low-sulfidity white liquor at 116 to form a white liquor of conventional sulfidity in a digester (not shown) known to those skilled in the art.

It is known that during the initial phase of wood digestion by the kraft process, elevated sulfidity in the white liquor increases selectivity for lignin degradation over cellulose attack. Preservation of the cellulose increases both yield and strength of the resulting pulp. Yield and strength of pulp are the two properties that nearly every kraft pulp mill tries to maximize. The present invention enables such advantageous modifications to be made to the kraft pulping process by providing a means to generate liquors of variable sulfidity. Variable sulfidity is achieved by blending the high- and low-sulfidity streams from, respectively, the scrubber discharge 104 and causticizer discharge 116.

The use of this invention is not limited to a kraft chemical recovery process based on black liquor gasification, but could be used, for example, in the generation of alkaline sulfite liquors from oxidized sulfur gases and alkaline hydroxide solutions. Alkaline sulfite pulping offers potential yield gains over conventional kraft pulping, especially in combination with the reagents anthraquinone, sodium sulfide, and/or methanol. Generation of alkaline sulfite liquors from a recovery-boiler based process requires several unit operations to separate reduced sulfur from the sodium in the process liquor, oxidize the sulfur to $SO_2$, and reabsorb the $SO_2$ into the process liquor to form a solution of primarily NaOH and $Na_2SO_3$. The considerable cost and complexity of these additional unit operations have hindered the development of alkaline sulfite processes. Pressurized, molten-phase gasification of black liquor effectively separates the sulfur from the sodium; hence, facilitating the production of alkaline sulfite liquor.

FIG. 3 illustrates a second embodiment of the invention as it pertains to generating an alkaline sulfite pulping liquor in an alkaline sulfite chemical recovery apparatus.

The equipment is substantially the same as was described above so that the same reference numerals are used to identify the same, or functionally similar parts. In addition to the scrubber tower components, the apparatus of FIG. 3 includes an integrated $H_2S$ burner device 11 and gas quench device 12. A acid gas 100 is burned with an excess of oxidant 118 in the controlled combustion device 11 used commercially in sulfur recovery operations such as Claus plants and acid- and neutral-sulfite pulping processes. The operating conditions and gas residence time are sufficient to maximize conversion of $H_2S$ to $SO_2$ while minimizing the production of sulfur trioxide ($SO_3$).

The oxidant 118 can be air but is preferably taken as a bleed stream from the pressurized oxygen supply to the black liquor gasifier. The $H_2S$ burner has a provision for firing auxiliary fuel 120 for start-up and combustion support, if the acid gas stream has insufficient heating value. Additionally, a provision for incinerating high-concentration, low-volume non-condensable gases (HCLV-NCG) 122 collected at appropriate points in the pulping operation would allow destruction of these pollutants and recovery of their sulfur content into the pulping liquor.

The desired gas mixture exiting the $H_2S$ burner 11 is rapidly cooled by evaporative cooling in the closely integrated quench chamber 12. A flooding spray of sulfite-rich liquor 124 is delivered from the scrubber tower sump by conduit 13 to a manifold or header 14. Multiple pressure nozzles 15 are arranged inside the quench chamber to provide rapid mixing with the gas exiting the $H_2S$ burner. The nozzles are preferably chosen to produce a coarse spray with low-pressure drop and freedom from pluggage, e.g., splash plate design. The nozzles are located to avoid direct impingement by the hot combustion gases, as shown in FIG. 3.

The cooled gases and remaining quench liquid pass by inclined conduit 16 into the bottom of the absorption tower 1. Selective absorption of $SO_2$ over $CO_2$ proceeds in a similar manner to that described above for the raw acid gas. The product of the selective absorption is a strong solution of $Na_2SO_3$ (124) which can be blended with the sulfide-lean caustic liquor 116 to achieve the desired pulping liquor composition. The combination of sulfite, $SO_3^{-2}$ and sulfide, $S^{-2}$ ions in an alkaline pulping liquor is expected to improve pulp yield compared to normal kraft white liquor.

The following advantages can be realized if the first embodiment of the present invention is used as part of a kraft pulping chemical recovery process based on black liquor gasification:
1. Multiple addition points of sulfide-lean white liquor maintain excess NaOH concentration on each gas-liquid contact tray which prevents $H_2S$ stripping and $NaHCO_3$ formation in the product white liquor.
2. Variations in acid gas composition ($H_2S/CO_2$ ratio) can be compensated for by changing the number of gas-liquid contact trays in service in the tower. For example, if $H_2S$ level drops in the acid gas, then higher $CO_2$ absorption into the white liquor would be expected if the number of gas-liquid contacting stages remains constant. Unlike conventional tray tower designs where liquid is delivered to the topmost tray and cascades down from tray to tray by a series of overflow weirs and downcomers, the individual supply lines and common downcomer allow this tower to be operated with one or more dry trays. The number of gas-liquid contact stages can therefore be changed by simply opening or closing the valves in the liquor supply line to each tray.

3. Only a portion of the total sulfide-lean white liquor stream is used in the scrubber to form a very high sulfidity white liquor which can either be blended with the remaining low sulfidity white liquor to generate conventional white liquor or can be used directly in a number of modified kraft pulping processes. For example, application of high sulfidity white liquor during the initial phase of the kraft "cook" has been claimed to improve pulp strength and increase yield of usable fiber from the fully pulped wood.

4. The equipment is modestly sized due to the low volume and high $H_2S$ content of the acid gas stream from the physical solvent-based sulfur removal process.

5. Because it is physically isolated from the main gasification process streams, the scrubber operates at low pressure (below 30 psi absolute) and low temperature (~120° F.) which reduce capital cost and corrosion rates as compared with alkaline scrubbing of the fuel gas at high pressure.

6. The scrubber tail gas has a small volumetric flow and low concentrations of $H_2S$ and other reduced sulfur gases which allow it to be delivered to the mill's NCG system for destruction.

The following advantages can be realized if the second embodiment of the present invention is used as part of an alkaline sulfite pulping chemical recovery process based on spent liquor gasification:

7. High purity oxygen (>90% $O_2$) can be taken as a minor bleed stream from the highpressure oxidant supply to the black liquor gasifier. The use of high purity oxygen to burn $H_2S$ in the acid gas will minimize product gas dilution and generate an adequate flame temperature for high $SO_2$ yield without the use of support fuel or fuel/oxidizer preheating.

8. Auxiliary fuel for $H_2S$ burner start-up and support during upset conditions can be taken as a minor bleed stream from the high-pressure fuel gas discharge line from the physical solvent scrubber in the black liquor gasification system.

9. Current environmental regulations require reduced sulfur gases to be collected and incinerated in kraft pulp mills. Even if there is little reduced sulfur content in the alkaline sulfite liquor produced by this process, some reduced sulfur emissions are expected from the pulp digesters and spent liquor evaporation operations. There will be additional $H_2S$ released when the sulfide-lean process liquor from the gasification process is flashed to atmospheric pressure prior to the causticizing operation. These emissions, known collectively as high-concentration, low-volume non-condensable gases (HCLV-NCG), could be incinerated in the $H_2S$ burner, which would return the fugitive sulfur to the pulping liquor.

10. Quenching the exit gases from $H_2S$ burner from above 1500° F. to approximately 250° F. (saturation temperature at 30 psia) will prevent the formation of significant sulfur trioxide content entering the scrubber. $SO_3$ is undesirable because it reacts with NaOH to form the inert chemical $Na_2SO_4$.

11. Multiple addition points of sulfide-lean caustic liquor maintain excess NaOH concentration on each gas-liquid contact tray which prevent acid bisulfite ($NaHSO_3$) formation in the product liquor.

12. Variations in converted acid gas composition ($SO_2/CO_2$ ratio) can be compensated for by changing the number of gas-liquid contact trays in service in the tower. For example, if $SO_2$ level drops in the acid gas, then higher $CO_2$ absorption into the white liquor would be expected if the number of gas-liquid contacting stages remains constant. The number of gas-liquid contact stages can therefore be changed by simply opening or closing the valves in the liquor supply line to each tray.

13. Only a portion of the total sulfide-lean caustic liquor stream is used in the scrubber to form a concentrated alkaline sulfite liquor which can either be used directly as a pulping liquor, or blended with the remaining low sulfidity caustic liquor to generate a hybrid alkaline sulfite and sulfide liquor which is expected to offer pulp yield and/or pulp property improvements as compared with conventional kraft pulping.

14. The equipment is modestly sized due to the low volume and high $SO_2$ content of the converted acid gas stream.

15. Because it is physically isolated from the main gasification process streams, the scrubber operates at low pressure (below 30 psi absolute) and low temperature (~120° F.) which reduce capital cost and corrosion rates as compared with alkaline scrubbing of the fuel gas at high pressure.

16. The scrubber tail gas has a small volumetric flow, absence of combustibles, and low concentration of $SO_2$ which allow it to be vented to the air delivery systems of any number of combustion devices with appropriate emissions controls (e.g., lime kiln, power boiler, recovery boiler).

Where process requirements require very high $H_2S$ or $SO_2$ recovery efficiencies, the proportionate ratio of $CO_2$ to $H_2S$ or $SO_2$ entering the top stages of the tower can become large. Under these conditions, the amount of $CO_2$ absorption compared to $H_2S$ or $SO_2$ removal can become excessive. For this reason, it can be advantageous to use weak wash (126 in FIG. 6) rather than low sulfidity white liquor in the top one or two stages of the tower 1. This spent weak wash 128 can be drawn off separately from the white liquor and returned to the gasification system as shown schematically in FIG. 6. The total carbonation of the white liquor can thus be reduced proportionately without a significant reduction in sulfur recovery. The downcomer can be divided into two parts 4a and 4b as shown schematically in FIG. 6.

While two specific embodiments of the invention has been shown and described in detail to illustrate the application of the principles of the invention, it will be understood that the invention may be embodied otherwise without departing from such principles.

We claim:

1. An apparatus for sulfur recovery comprising:
   a scrubber tower;
   a plurality of vertically spaced scrubber trays in the tower;
   means for supplying sulfide-lean liquor to each of the trays;
   means for supplying an acid gas to the tower below the trays;
   a downcomer extending in the tower and through the trays for accumulating liquid from the trays and moving the liquid to the bottom of the tower;
   the sulfide-lean liquor and acid gas being selected to form a sulfite-rich or sulfide-rich liquor in each of the trays which are brought to the bottom of the tower through the downcomer for removal from the tower.

2. The apparatus according to claim 1, including means for removing some sulfide-lean liquor from the means for supplying the sulfide-lean liquor and for mixing the sulfide-lean liquor with the sulfite-rich or sulfide-rich liquor for producing a mixture having selected composition.

3. The apparatus according to claim 1, wherein the sulfide-lean liquor comprises white liquor from a causticizer.

4. The apparatus according to claim 1, wherein the acid gas is from a physical solvent gas clean-up system.

5. The apparatus according to claim 1, including a sulfur compound burner device for producing acid gas connected to the bottom of the tower for supplying the acid gas to the tower.

6. The apparatus according to claim 5, wherein the burner device is adapted to burn $H_2S$.

7. The apparatus according to claim 1, including a sulfur removal system connected to the tower for supplying acid gas to the tower.

8. The apparatus according to claim 1, wherein the downcomer has an upper part connected to at least one of the trays for discharging weak wash, and a lower part connected to at least one of the trays for supplying liquid to the bottom of the tower.

9. The apparatus according to claim 1, including an additional scrubber tray above the plurality of trays and means for mechanically flow-turning gases above and below the additional tray, the apparatus also including means for supplying process water from a high pressure system above the additional tray and means for removing process water from the additional tray.

10. A method for sulfur recovery comprising:
   providing a scrubber tower;
   providing a plurality of vertically spaced scrubber trays in the tower;
   supplying sulfide-lean liquor to each of the trays;
   supplying an acid gas to the tower below the trays;
   accumulating liquid from the trays and moving the liquid to the bottom of the tower;
   selecting the sulfide-lean liquor and acid gas to form a sulfite-rich or sulfide-rich liquor in each of the trays which are brought to the bottom of the tower; and
   removing the sulfite-rich or sulfide-rich liquor from the bottom of the tower.

11. The method according to claim 10, including removing some sulfide-lean liquor from its supply to the tower; and mixing the sulfide-lean liquor with the sulfite-rich or sulfide-rich liquor for producing a mixture having selected composition.

12. The method according to claim 10, wherein the sulfide-lean liquor is white liquor supplied from a causticizer.

13. The method according to claim 10, wherein the acid gas is supplied from a physical solvent gas clean-up system.

14. The method according to claim 10, including providing a sulfur compound burner device and producing the acid gas for the bottom of the tower in the device.

15. The method according to claim 14, including burning $H_2S$ in the burner device.

16. The method according to claim 10, including providing a sulfur removal system for supplying acid gas to the tower.

17. The method according to claim 10, including discharging weak wash from an upper part of the tower and supplying remaining liquid from the trays to the bottom of the tower.

18. The method according to claim 10, including providing an additional tray above the plurality of trays, mechanically flow-turning gases above and below the additional tray, supplying process water from a high pressure system above the additional tray and removing process water from the additional tray.

* * * * *